United States Patent
Suzuki

(10) Patent No.: US 9,588,755 B2
(45) Date of Patent: Mar. 7, 2017

(54) INFORMATION PROCESSING APPARATUS CAPABLE OF CONTROLLING INSTALLATION OF APPLICATION, METHOD OF CONTROLLING THE SAME, AND STORAGE MEDIUM

(71) Applicant: CANON KABUSHIKI KAISHA, Tokyo (JP)

(72) Inventor: Tomo Suzuki, Tama (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 14/676,288

(22) Filed: Apr. 1, 2015

(65) Prior Publication Data
US 2015/0286474 A1 Oct. 8, 2015

(30) Foreign Application Priority Data
Apr. 2, 2014 (JP) .................................. 2014-076176

(51) Int. Cl.
*G06F 9/445* (2006.01)
(52) U.S. Cl.
CPC . *G06F 8/62* (2013.01); *G06F 8/61* (2013.01)
(58) Field of Classification Search
CPC .................................... G06F 8/61; G06F 8/62
See application file for complete search history.

(56) References Cited

U.S. PATENT DOCUMENTS

| | | | |
|---|---|---|---|
| 9,311,194 B1 * | 4/2016 | Cypher | G06F 11/1474 |
| 2003/0014381 A1 * | 1/2003 | McMillan | G06F 8/61 |
| 2005/0149940 A1 * | 7/2005 | Calinescu | G06F 9/5061 718/104 |
| 2008/0043657 A1 * | 2/2008 | Ishii | H04L 1/0003 370/311 |
| 2008/0120129 A1 * | 5/2008 | Seubert | G06Q 10/06 705/35 |
| 2009/0217260 A1 * | 8/2009 | Gebhart | G06F 9/45533 717/174 |
| 2009/0276771 A1 * | 11/2009 | Nickolov | G06F 9/4856 717/177 |
| 2010/0122247 A1 * | 5/2010 | Ikeda | G06F 8/61 717/174 |
| 2011/0154302 A1 * | 6/2011 | Balko | G06F 8/10 717/140 |

(Continued)

FOREIGN PATENT DOCUMENTS

JP 2011243232 A 12/2011

*Primary Examiner* — Chameli Das
(74) *Attorney, Agent, or Firm* — Rossi, Kimms & McDowell LLP

(57) ABSTRACT

An information processing apparatus capable of performing application installation control while taking into account amounts of resources to be changed by installation of an extension application to be attached to an associated application. When a fragment bundle is installed, total values of amounts of the resources used by installed applications including a host bundle assumed to have been extended in function by the fragment bundle are calculated. It is determined whether the total values are within allowable upper limit values allowed by the apparatus. If it is determined that the total values are within their allowable upper limit values, the fragment bundle is installed.

7 Claims, 13 Drawing Sheets

(56) References Cited

U.S. PATENT DOCUMENTS

| | | | |
|---|---|---|---|
| 2011/0276981 A1* | 11/2011 | Clohessy | G06F 9/5016 718/104 |
| 2012/0016681 A1* | 1/2012 | Joergensen | G06F 9/5011 705/1.1 |
| 2013/0014122 A1* | 1/2013 | Nord | G06F 9/5077 718/104 |
| 2013/0185712 A1* | 7/2013 | Osada | G06F 8/61 717/174 |
| 2014/0149984 A1* | 5/2014 | Takahashi | G06F 9/4856 718/1 |
| 2015/0039766 A1* | 2/2015 | Bachar | H04L 47/70 709/226 |
| 2015/0058933 A1* | 2/2015 | Larson | H04L 63/10 726/3 |
| 2015/0074269 A1* | 3/2015 | Hassan | H04L 12/1421 709/224 |
| 2015/0154057 A1* | 6/2015 | McGrath | G06F 9/45533 718/1 |
| 2015/0178135 A1* | 6/2015 | Wang | G06F 9/5027 718/104 |
| 2015/0206179 A1* | 7/2015 | Tulloch | G06Q 30/0247 705/14.46 |
| 2015/0261523 A1* | 9/2015 | Liu | H04L 67/10 717/169 |
| 2016/0162320 A1* | 6/2016 | Singh | G06F 9/5055 718/1 |

\* cited by examiner

FIG. 5

| | RESOURCE | HOST BUNDLE | FRAGMENT BUNDLE | TOTAL RESOURCE CONSUMPTION |
|---|---|---|---|---|
| APPLICATION A (701) | MaximumMemoryUsage | 1000 | - | 1000 |
| | MaximumThreadUsage | 3 | - | 3 |
| | MaximumSocketUsage | 2 | - | 2 |
| | MaximumFiledescriptorUsage | 1 | - | 1 |
| | MaximumFilespaceUsage | 2000 | - | 2000 |
| APPLICATION A & FRAGMENT A (702) | MaximumMemoryUsage | 1000 | 1000 | 2000 |
| | MaximumThreadUsage | 3 | 2 | 5 |
| | MaximumSocketUsage | 2 | 1 | 3 |
| | MaximumFiledescriptorUsage | 1 | 0 | 1 |
| | MaximumFilespaceUsage | 2000 | 2000 | 4000 |
| APPLICATION A & FRAGMENT B (703) | MaximumMemoryUsage | 1000 | 1000 | 2000 |
| | MaximumThreadUsage | 3 | -1 | 2 |
| | MaximumSocketUsage | 2 | 0 | 2 |
| | MaximumFiledescriptorUsage | 1 | 0 | 1 |
| | MaximumFilespaceUsage | 2000 | -500 | 1500 |

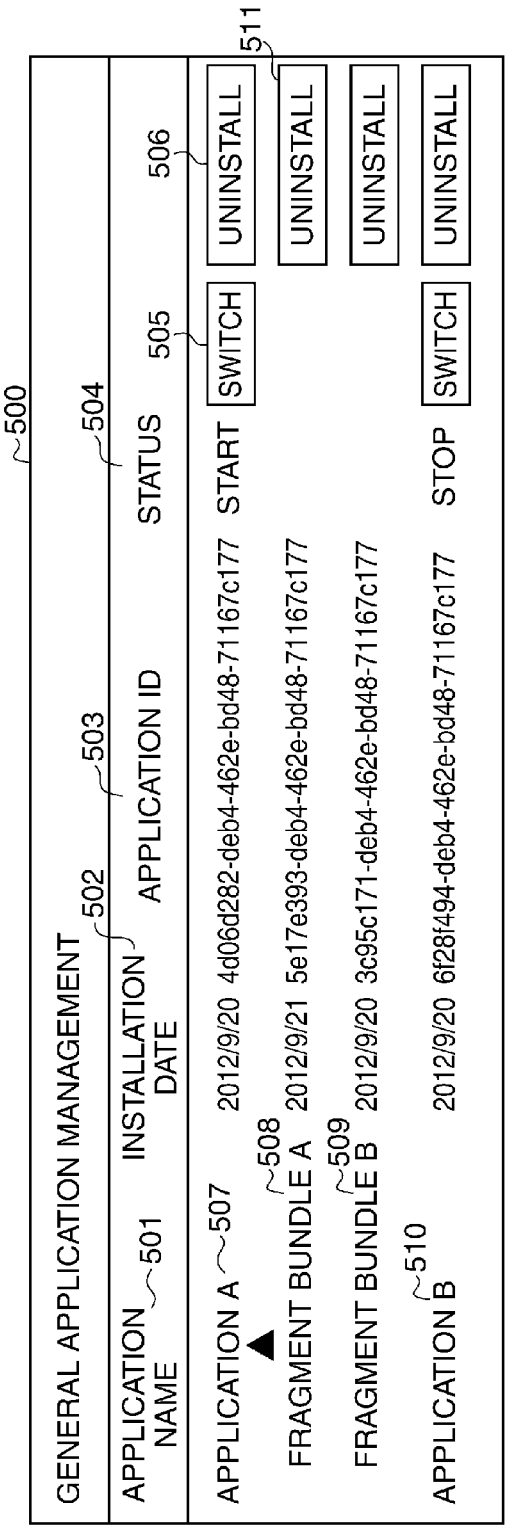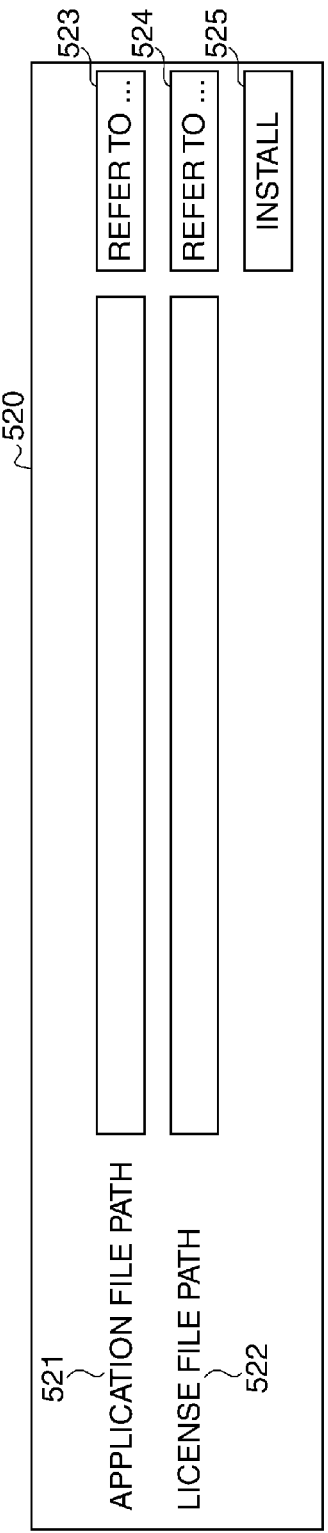

FIG. 10

| SELECTION OF FRAGMENT BUNDLE TO BE DELETED ~1201 | | | | |
|---|---|---|---|---|
| APPLICATION NAME ~1202 | INSTALLATION DATE ~1203 | APPLICATION ID | STATUS ~1204 | RESOURCE CONSUMPTION ~1205 |
| APPLICATION A □FRAGMENT BUNDLE A ~1208 ~1206 | 2012/9/20 | 4d06d282-deb4-462e-bd48-71167c177 | START | MEM:200,TH:3,SOC:3,FD:3,HDD:300 |
| APPLICATION B □FRAGMENT BUNDLE B ~1209 ~1207 | 2012/9/21 | 5e17e393-deb4-462e-bd48-71167c177 | START | MEM:100,TH:0,SOC:2,FD:2,HDD:200 |
| 1211 □FRAGMENT BUNDLE C ~1210 | 2012/9/20 | 3c95c171-deb4-462e-bd48-71167c177 | STOP | MEM:150,TH:1,SOC:1,FD:1,HDD:100 |

[UNINSTALL] ~1212   [CANCEL] ~1213

~1200

INFORMATION PROCESSING APPARATUS CAPABLE OF CONTROLLING INSTALLATION OF APPLICATION, METHOD OF CONTROLLING THE SAME, AND STORAGE MEDIUM

BACKGROUND OF THE INVENTION

Field of the Invention

The present invention relates to an information processing apparatus capable of controlling installation of an application, a method of controlling the same, and a storage medium.

Description of the Related Art

In recent years, in an information processing apparatus, such as an image forming apparatus, an application operating environment, notably a Java™ environment, has come to be provided. Further, a technique is proposed which provides an extensible application by making use of the portability of a program provided in an application operating environment such as Java™. Java™ is a registered trademark of Oracle® and/or its affiliates.

To improve the functions and usability of the image forming apparatus, an application that operates under an application operating environment, such as the Java™ environment, is created and installed in the image forming apparatus, whereby it is possible to realize desired functions in the image forming apparatus.

As an application platform, there has been proposed an OSGi (Open Services Gateway initiative) Service Platform (hereinafter simply referred to as the "OSGi"), which is an application platform for built-in devices, operating under an application operating environment such as Java™.

The OSGi defines a bundle as a management unit of a software module, and defines specifications for managing a life cycle of install, start, stop, update, and uninstall.

The bundle refers to a module, operating in an application operating environment such as Java™. Further, the OSGi can provide the application with built-in functions, such as a copy function, a scan function, and a print function.

Further, the specifications of the OSGi include a host bundle and a fragment bundle. The fragment bundle is a bundle in a form which does not operate singly, but attaches the bundle itself to a class loader space of the host bundle.

To correct or extend the application, the function of the host bundle is corrected or extended using the fragment bundle, whereby it is possible to reduce the size of a file to be installed, which contributes to efficient module distribution.

Under the above-described technical background, many of image forming apparatuses are not provided with a wealth of system resources in view of cost reduction. For this reason, to install or start an application, there has been proposed a technique that checks whether or not system resources required for proper operation of the application can be secured to thereby prevent occurrence of a failure or an erroneous operation of the apparatus (see e.g. Japanese Patent Laid-Open Publication No. 2011-243232).

However, in a case where a fragment bundle is installed, for example, amounts of resources required by an installed host bundle are sometimes increased. In this case, it is impossible for the amounts of the resources checked during installation or execution of the host bundle to guarantee the securing of the system resources required for proper operation of the application.

Further, some host bundles provided on the precondition of using a fragment bundle perform a function equipped in the fragment bundle instead of using a corresponding standard function of the host bundle.

In such a case, the required amounts of resources are sometimes reduced by the use of the fragment bundle. Therefore, uninstallation of the fragment bundle increases the amounts of resources required by the application, and hence, depending on the amounts of the resources, it is impossible to uninstall the fragment bundle alone.

As described above, in the conventional technique, when installing or uninstalling an application for extension, amounts of resources changed by installation or uninstallation of the application for extension are not taken into account.

SUMMARY OF THE INVENTION

The present invention provides an information processing apparatus that is capable of performing application installation control while taking into account amounts of resources to be changed by installation of an extension application for extending a function of an application associated therewith, a method of controlling the information processing apparatus, and a storage medium.

In a first aspect of the present invention, there is provided an information processing apparatus that is capable of installing an extension application which operates using resources of the information processing apparatus and extends a function of an application installed in the information processing apparatus, comprising a calculation unit configured to calculate, in a case where the extension application is to be installed, respective total values of amounts of resources that are used by installed applications including an extension target application which is assumed to have been extended in function by the extension application, a determination unit configured to determine whether or not the total values calculated by the calculation unit are within allowable upper limit values allowed by the information processing apparatus, and an installation unit configured to install the extension application in a case where it is determined by the determination unit that the total values are within the allowable upper limit values.

In a second aspect of the present invention, there is provided a method of controlling an information processing apparatus that is capable of installing an extension application which operates using resources of the information processing apparatus and extends a function of an application installed in the information processing apparatus, comprising calculating, in a case where the extension application is to be installed, respective total values of amounts of resources that are used by installed applications including an extension target application which is assumed to have been extended in function by the extension application, determining whether or not the total values calculated by said calculating are within allowable upper limit values allowed by the information processing apparatus, and installing the extension application in a case where it is determined by said determining that the total values are within the allowable upper limit values.

In a third aspect of the present invention, there is provided a non-transitory computer-readable storage medium storing a computer-executable program for executing a method of controlling an information processing apparatus that is capable of installing an extension application which operates using resources of the information processing apparatus and extends a function of an application installed in the information processing apparatus, wherein the method comprises calculating, in a case where the extension application is to be installed, respective total values of amounts of resources that are used by installed applications including an extension target application which is assumed to have been extended in function by the extension application, determining whether or not the total values calculated by said calculating are within allowable upper limit values allowed by the information processing apparatus, and installing the extension application in a case where it is determined by said determining that the total values are within the allowable upper limit values.

According to the present invention, there are calculated respective total values of amounts of resources used by installed applications including the extension target application which is assumed to have been extended in function by the extension application, and in a case where the calculated total values are within the allowable upper limit values allowed by the information processing apparatus, the extension application is installed. Therefore, it is possible to perform application installation control while taking into account amounts of resources to be changed by installation of an extension application for extending a function of an application associated therewith.

Further features of the present invention will become apparent from the following description of exemplary embodiments (with reference to the attached drawings).

BRIEF DESCRIPTION OF THE DRAWINGS

FIG. 5 is a diagram showing total resource consumptions by the application in the manifest shown in FIG. 4B, and total resource consumptions by the application calculated from a combination of the manifest in FIG. 4B and the manifest in FIG. 4C and total resource consumptions by the application calculated from a combination of the manifest in FIG. 4B and the manifest in FIG. 4D.

FIG. 6A is a diagram of an application management screen displayed by an application management section appearing in FIG. 2.

FIG. 6B is a diagram of an application installation screen displayed by the application management section.

FIG. 10 is a diagram of a deletion candidate screen displayed by the application management section appearing in FIG. 2.

DESCRIPTION OF THE EMBODIMENTS

The present invention will now be described in detail below with reference to the accompanying drawings showing embodiments thereof.

Figure 1:
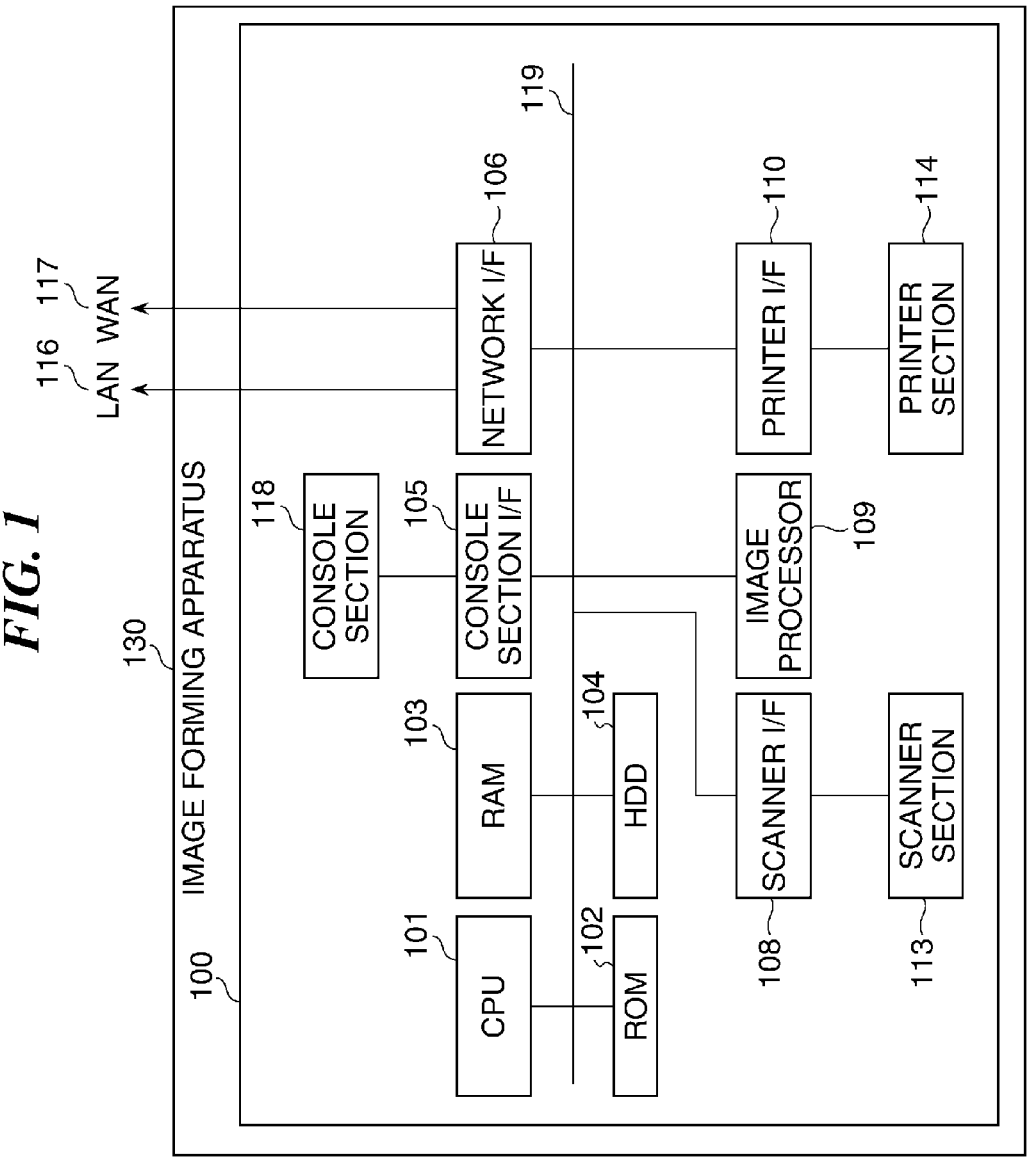
FIG. 1 is a schematic block diagram of an image forming apparatus as an information processing apparatus according to an embodiment of the present invention.

FIG. 1 is a schematic block diagram of an image forming apparatus 130 as an information processing apparatus according to an embodiment of the present invention.

Referring to FIG. 1, the image forming apparatus 130 includes a controller 100. The controller 100 is comprised of a CPU 101, a ROM 102, a RAM 103, an HDD (Hard Disk Drive) 104, a console section interface 105, a network interface 106, a scanner interface 108, an image processor 109, a printer interface 110, a scanner section 113, a printer section 114, and a console section 118, which are connected to each other by a system bus 119.

The CPU 101 performs centralized control of access to various types of hardware connected to the system bus 119 based on a control program and the like stored in the ROM 102. Further, the CPU 101 also performs centralized control of various processes performed by the controller 100.

The ROM 102 is a read only nonvolatile storage device, and stores a boot program and the like for the image forming apparatus 130.

The RAM 103 serves as a system work memory for the operation of the CPU 101, and also serves as a memory for temporarily storing various programs and data. The RAM 103 is implemented by either of an FRAM (Ferroelectric Random Access Memory: registered trademark) and an SRAM (Static RAM) which are capable of storing data even after the image forming apparatus 130 is powered off, or a DRAM (Dynamic RAM) from which data is deleted when the image forming apparatus 130 is powered off.

The HDD 104 is a nonvolatile storage device, and stores various programs, such as a system application and various types of data. Applications installed in the present embodiment are stored in the HDD 104.

The console section interface 105 connects between the system bus 119 and the console section 118.

More specifically, the console section interface 105 receives data from the system bus 119, and displays the data on the console section 118. Further, the console section interface 105 outputs information input from the console section 118 to the system bus 119. The user provides instructions and information to the image forming apparatus 130 via the console section 118.

The network interface 106 is connected to a LAN (Local Area Network) 116 and a WAN (Wide Area Network) 117, and transmits and receives information to and from external apparatuses. The scanner interface 108 outputs image data received from the scanner section 113 to the system bus 119.

The image processor 109 performs turning, compression, expansion, and so forth, on image data. The printer interface 110 receives image data sent from the image processor 109, and output the image data to the printer section 114. The printer section 114 prints image data output from the printer interface 110 on a recording medium, such as a sheet.

As described above, similar to a general information processing apparatus, the image forming apparatus 130 is comprised of a computing device, volatile storage devices, nonvolatile storage devices, and so forth.

Although a PC for communicating with the image forming apparatus 130 configured as above is a general personal computer capable of executing a web browser, the PC may be replaced by a smart phone or a tablet terminal which is capable of executing a web browser.

Figure 2:
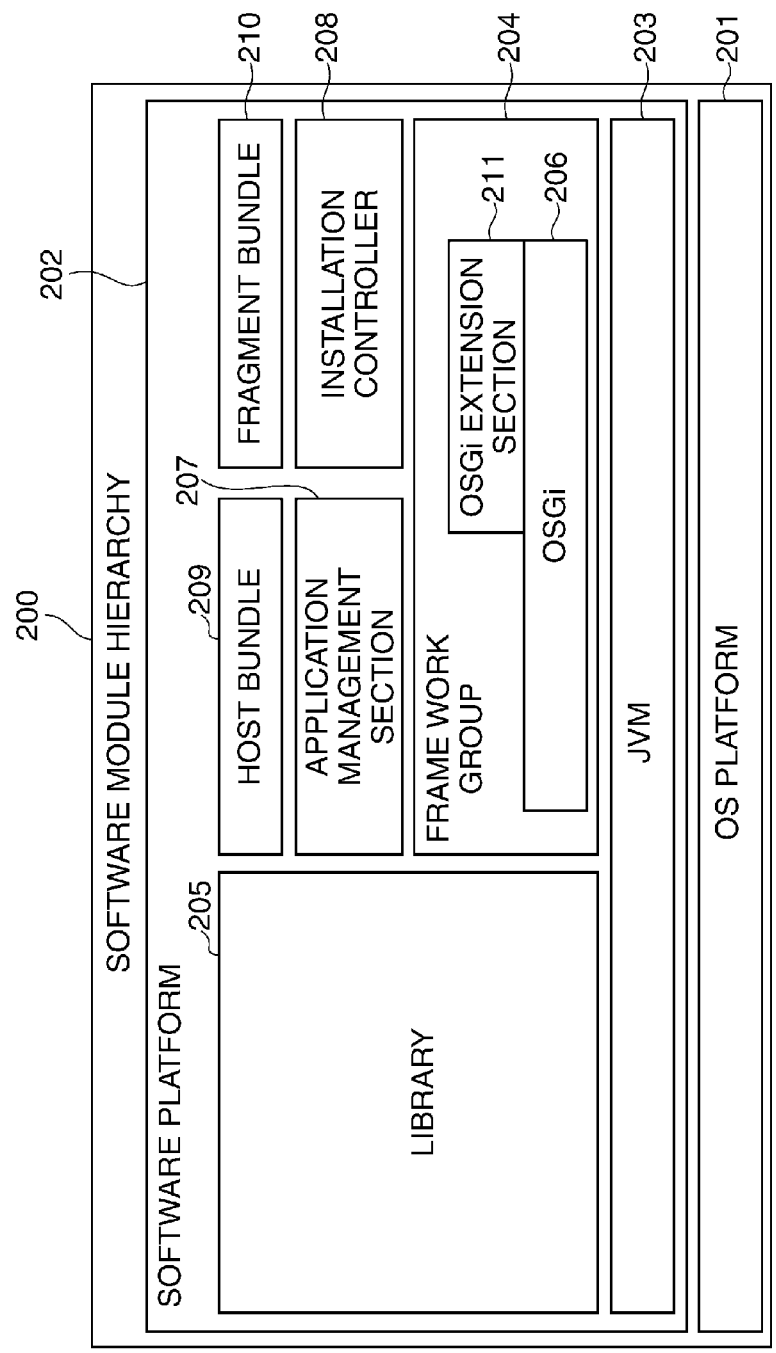
FIG. 2 is a diagram of a software module hierarchy of the image forming apparatus appearing in FIG. 1.

FIG. 2 is a diagram of a software module hierarchy 200 of the image forming apparatus 130 shown in FIG. 1.

Software shown in FIG. 2 is stored in the ROM 102 or the HDD 104, and is executed by the CPU 101. Further, various information used during execution of the software is stored in the RAM 103 or the HDD 104, and is exchanged between the functions of the software.

The software includes an OS (Operating System) platform 201. A software platform 202 is built on the OS platform 201.

The software platform 202 is formed as a run-time environment of a JVM 203 (Java™ Virtual Machine), which operates under JAVA™ application operating environment, and includes the JVM 203 as an interpreter, a library 205, and a frame work group 204.

The library 205 includes a standard API (Application Programming Interface) library. Further, the frame work group 204 includes an OSGi (Open Services Gateway initiative) 206 and an OSGi extension section 211.

The OSGi 206 causes a plurality of applications to operate on the JVM 203 which is single. Further, the OSGi 206 provides functions for life cycle management of applications, and communication between the applications. Furthermore, a plurality of system services are preinstalled on the OSGi 206. The OSGi extension section 211 is capable of extending the functions of the OSGi 206, on an as-needed basis.

Further, when the image forming apparatus 130 is started up, the OSGi 206 starts the services of an installation controller 208, an application management section 207, a host bundle 209, and a fragment bundle 210 attached to the host bundle 209, according to a service start order list stored in the HDD 104.

Out of the above components, the host bundle 209 is an application body, and is a bundle to which the fragment bundle 210 is attached. Further, the fragment bundle 210 is an extension application, and is a bundle which does not operate singly but attaches itself to the class loader space of the host bundle 209.

Here, the term "class loader" refers to an object which is in charge of loading classes and searching resources. All the classes are loaded into the JVM 203 by the class loader, and become usable from the application. That is, after installation of the fragment bundle 210, all the classes become usable as part of the host bundle 209. Therefore, when the fragment bundle 210 is installed to attach itself to the host bundle 209 or uninstalled, in general, the amounts of resources used by the host bundle 209 are changed.

The extension application includes e.g. a class of Java™, which is an application operating environment, which provides an extension for resource data, such as image data and language data.

Further, the host bundle 209 provides to the user various processes performed by the image forming apparatus 130 singly or together with the fragment bundle 210, under the control of the application management section 207. Examples of the various processes include processes by applications for manipulating and compressing images and processes by an application for performing department management, such as restrictions on printing, and like other applications. The above-described host bundle 209 corresponds to an extension target application, and the fragment bundle 210 corresponds to an extension application for extending the function of the application to be extended. Further, the host bundle 209 and the fragment bundle 210 operate using resources of the image forming apparatus 130. Further, as described above, the image forming apparatus 130 is configured to be capable of installing a fragment bundle for extending the function of a host bundle installed on the image forming apparatus 130.

The application management section 207 manages a plurality of application groups, and performs installation and uninstallation of applications, and so forth, using the installation controller 208.

Further, the application management section 207 stores application information and license information including versions of the host bundle 209 and the fragment bundle 210, which are installed under the control thereof.

Furthermore, in response to an uninstallation instruction to an application in the image forming apparatus 130, the application management section 207 removes the host bundle 209 or the fragment bundle 210 from objects to be managed, via the installation controller 208.

Figure 3:
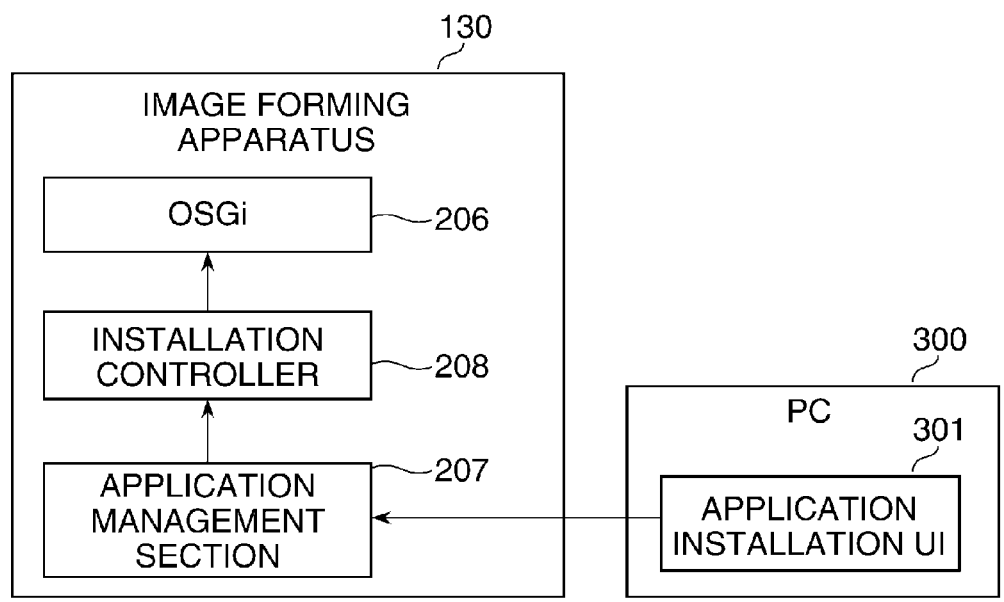
FIG. 3 is a diagram illustrating a flow of a process for installing an application from a PC to the image forming apparatus.

FIG. 3 is a diagram illustrating a flow of a process for installing an application from a PC 300 into the image forming apparatus 130.

Note that in the example of the present embodiment, the application mentioned in FIG. 3 is intended to mean the host bundle 209 or the fragment bundle 210.

Referring to FIG. 3, the PC 300 displays an application installation UI (user interface) 301, formed by a web page displayed on an installation screen, described hereinafter, on a web browser (not shown). When the user designates an application that the user desires to install, from the install UI 301, the PC 300 installs the application.

Upon receipt of an application file designated from the install UI 301, the application management section 207 passes the application file to the installation controller 208. Upon receipt of the application file, the installation controller 208 requests the OSGi 206 to install the application file, and the OSGi 206 installs the application file. The installed application is managed by the application management section 207.

Figure 4A:
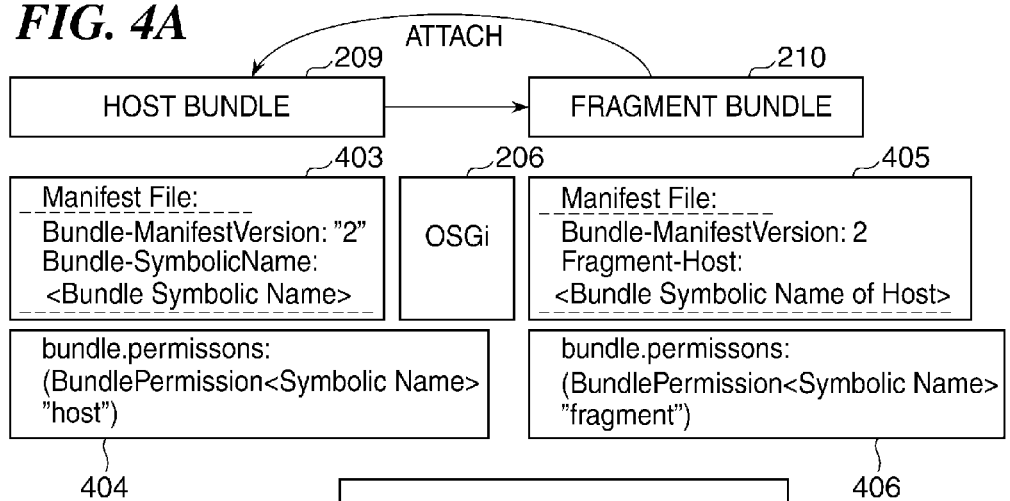
FIG. 4A is a diagram of an example of installation for attaching a fragment bundle to a host bundle.
Figure 4B:
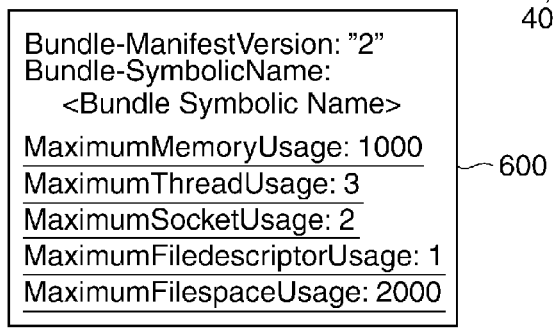
FIGS. 4B to 4D are diagrams of examples of manifests used when the fragment bundle is attached to the host bundle.
Figure 4C:
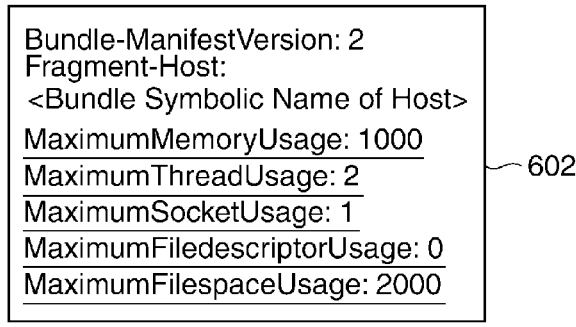
Figure 4D:
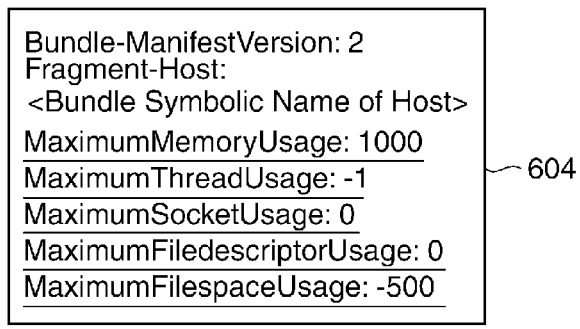

FIG. 4A is a diagram of an example of installation in which the fragment bundle is attached to the host bundle, and FIGS. 4B to 4D are diagrams of examples of manifests used when the fragment bundle is attached to the host bundle.

FIG. 4A shows an example of installation of the fragment bundle 210 in the host bundle 209.

Note that attaching of the fragment bundle to the host bundle is sometimes referred to as installation.

As shown in FIG. 4A, Bundle-ManifestVersion of a manifest 403 of the host bundle is specified as 2. Bundle-SymbolicName in the manifest 403 is given a unique name within a frame work.

Further, permissions 404 of the host bundle are defined as (BundlePermission <Symbolic Name> "host").

On the other hand, Bundle-ManifestVersion of a manifest 405 of the fragment bundle is specified as 2.

Fragment-Host in the manifest 405 is specified by <Bundle Symbolic Name of Host> which refers to a bundle symbolic name described in the manifest 403 of the host bundle. When the respective values of Bundle-SymbolicName in the manifest 403 and Fragment-Host in the manifest 405 are equal to each other, it indicates that the host bundle and the fragment bundle are component parts of the same application.

Further, permissions 406 of the fragment bundle are described as (BundlePermission <Symbolic Name> "fragment").

When installing the fragment bundle with the information described in the above-described manifests, the OSGi 206 identifies the host bundle based on the manifest information of the fragment bundle, and adds a class path of the fragment bundle itself to a class path of the host bundle.

Here, the term "class path" specifies a location from where the JVM 203 is required to read a class file when performing a Java™, which is an application operating environment, application.

Further, classes and resources within the fragment bundle are all loaded by the class loader of the host bundle.

In the fragment bundle, it is possible to extend resources including resources for country-specific languages so as to enable switching between display languages of the host bundle, and extend standard functions of the application.

Further, to uninstall a fragment bundle attached to the host bundle, it is required to delete a class path of the fragment bundle itself from class paths of the host bundle, and further load a class necessary for the host bundle again, using the class loader of the host bundle.

FIGS. 4B, 4C, and 4D are diagrams showing declarations of resource consumptions described in manifests of the host bundle 209 and the fragment bundle 210.

In the manifests appearing in FIGS. 4B, 4C, and 4D, "MaximumMemoryUsage" indicates the maximum amount of memory to be used, "MaximumThreadUsage" indicates the maximum number of threads to be used, "MaximumSocketUsage" indicates the maximum number of sockets to be used, "MaximumFiledescriptorUsage" indicates the maximum number of file descriptors to be used, and "MaximumFilespaceUsage" indicates the maximum amount of disk space to be used. On the other hands, in association with these items, there are separately defined beforehand respective allowable upper limit values of the amount of memory, the number of threads, the number of sockets, the number of file descriptors, and the amount of disk space, that are usable in the image forming apparatus 130.

FIG. 4B shows a manifest 600 of the host bundle 209. The manifest 600 describes the maximum resource consumptions of respective resources consumed when the host bundle 209 operates singly.

Further, FIG. 4C shows a manifest 602 of the fragment bundle 210 in a case where some of the resource consumptions are increased by the installation of the fragment bundle 210.

Descriptions in the manifest 602 indicate the amounts of respective resources increased or reduced by the fragment bundle 210, when the fragment bundle 210 is installed to attach itself to the host bundle 209 and is operated, in a case where attention is paid to the totals of resource consumptions by the host bundle and the fragment bundle, i.e. the whole application. In the case of FIG. 4C, there are entries of positive values, but there are no entries of negative values, which means that the amounts of resources to be used are increased. For example, the maximum thread usage "MaximumThreadUsage" of the fragment bundle 210 appearing in FIG. 4C is 2, and hence the associated resource consumption by the application is increased by 2 by the installation of the fragment bundle 210.

Note that when the maximum consumption of a resource by the application is not changed in spite of the installation of the fragment bundle 210, 0 is entered as a value of the maximum resource consumption associated with the resource.

FIG. 4D shows a manifest 604 of the fragment bundle 210 in a case where some of the resource consumptions are reduced by the installation of the fragment bundle 210.

Descriptions in the manifest 604 indicate, similarly to those in the manifest 602, the amounts of respective resources increased or reduced by the fragment bundle 210, when the fragment bundle 210 is installed to attach itself to the host bundle 209 and is operated, in a case where attention is paid to the totals of resource consumptions by the host bundle and the fragment bundle, i.e. the whole application. However, in this case, there are entries of negative values, which means that the amounts of resources are reduced. For example, "MaximumThreadUsage" of the fragment bundle 210 appearing in FIG. 4D is −1, and hence the associated resource consumption by the application is reduced by 1 by the installation of the fragment bundle 210.

Thus, in the case of FIG. 4D, when the fragment bundle 210 of the manifest 604 is installed, the maximum number of used threads and the maximum amount of used disk space are reduced, compared with when the host bundle 209 is operated singly.

Note that it is also possible to employ a method in which total resource consumptions obtained by combining the amounts of resources to be used by the host bundle 209 and the fragment bundle 210 are entered e.g. in the manifest 602 of the fragment bundle 210.

In this method, however, when any of the maximum resource consumptions in the host bundle 209 itself are changed by addition of a function to the host bundle 209, it is required to also change the values of resource consumptions entered in the manifest 602 of the fragment bundle 210.

Therefore, to reduce influence of a change in resource consumptions in a specific host bundle 209, it is desirable to enter only differences in resource consumption from the host bundle, in the manifests 602 and 604 of the fragment bundle 210.

FIG. 5 is a diagram showing total resource consumptions by the application appearing in the manifest 600 shown in FIG. 4B, and total resource consumptions by the application calculated from a combination of the manifest 600 in FIG. 4B and the manifest 602 in FIG. 4C and total resource consumptions by the application calculated from a combination of the manifest 600 in FIG. 4B and the manifest 604 in FIG. 4D.

Referring to FIG. 5, a field 701 of Application A displays the resource consumptions by the application when the host bundle 209 having the manifest 600 operates singly. Values appearing in the manifest 600 are directly entered as total resource consumptions in the application A.

A field 702 of Application A and Fragment A displays the total resource consumptions by the application when the fragment bundle 210 having the manifest 602 is attached to the host bundle 209 having the manifest 600 and is operated. Values obtained by adding values of the resource consumptions in the manifest 600 and values of the resource consumptions in the manifest 602 to each other are entered as the total resource consumptions by the application.

Further, a field 703 of Application A and Fragment B displays the total resource consumptions by the application when the fragment bundle 210 having the manifest 604 is attached to the host bundle 209 having the manifest 600 and is operated. Values obtained by adding values of the resource consumptions in the manifests 600 and values of the resource consumptions in the manifest 602 to each other are entered as the total resource consumptions by the application.

Although this field 703 of Application A and Fragment B is the same as the field 702 of Application A and Fragment A in that values obtained by adding values of the resource consumptions in both the manifests are entered as the total resource consumptions by the application, the field 703 shows that the total resource consumptions shown in "MaximumThreadUsage" and "MaximumFilespaceUsage" become smaller than when the host bundle is operated singly.

In the present embodiment, the installation and uninstallation of the fragment bundle 210 are achieved by also taking into account cases where any of the total resource consumptions become smaller.

Note that resource consumptions declared by an application are amounts of resources mainly consumed during execution of the application, and hence it is not necessarily required to check all the resource consumptions during the installation of a fragment bundle. A resource consumption to be checked during the installation is an amount of disk space to be used including an amount of disk space to be occupied by a file itself of the application, and in general, the remaining resource consumptions are checked during operation of the application.

As described above, in the present embodiment, there are used amounts of resources used by the host bundle without a fragment bundle installed therein, and respective differences (amounts of decrease or increase) between the mentioned amounts of resources used by the host bundle and amounts of resources used by the host bundle with the fragment bundle installed therein, whereby the total resource consumptions are indicated by respective total values of the amounts of resources and the differences (amounts of decrease or increase).

FIGS. 6A and 6B are diagrams of an application management screen 500 and an application installation screen 520 which are displayed by the application management section 207 appearing in FIG. 2.

FIG. 6A shows the application management screen 500 displayed on the web browser of the PC 300.

The name of an application under management is displayed at an application name 501. In the illustrated example, two applications, i.e. an application A 507 and an application B 510 are under management.

Further, a fragment bundle A 508 and a fragment bundle B 509 are managed by setting the application A as a host bundle. The fragment bundles A 508 and B 509 are displayed on the application management screen 500 in association with the application A 507.

An installation date 502 is a date on which an associated application was installed. An installation ID 503 indicates an ID (identifier) uniquely assigned to an associated application.

A status 504 indicates a status of an associated application. When an application has been started, the status thereof is displayed as "started", whereas when the application has been stopped, the status thereof is displayed as "stopped".

A switch button 505 switches between the start and stop of an associated application. In a case where an application is in a started state, the switch button 505 functions as a stop button, whereas in a case where the application is in a stopped state, the switch button 505 functions as a start button.

For example, when the switch button 505 associated with the application A 507 which is in the started state is depressed, the status 504 of the application A 507 is changed to "stopped".

On the other hand, when the switch button 505 associated with the application B 510 which is in the stopped state is depressed, the status 504 of the application B 510 is changed to "started".

An uninstall button 506 is used for uninstalling each application. In the uninstallation of a fragment bundle, only the fragment bundle is uninstalled.

For example, when an uninstall button 511 associated with the fragment bundle A is depressed, only the fragment bundle A is uninstalled.

FIG. 6B shows the application installation screen 520 displayed on the web browser of the PC 300.

Referring to FIG. 6B, a reference button 523 is used for displaying a screen for use in selecting a file path. When an application file is designated on the screen, a path to the application file is input to an application file path 521.

Some applications each sometimes require a license file for decoding a file of an application during an installation process, from the viewpoint of security and business.

In such a case, when the user depresses a reference button 524, a screen for selecting a file path is displayed. When a license file is designated on the screen, a path to the license file is input to a license file path 522.

When an install button 525 is depressed, installation of an application designated by the application file path 521 is started.

Next, a description will be given of a general process performed during the installation of the application. As mentioned hereinabove, in general, the resource consumption to be checked during the installation is an amount of disk space to be used, and the remaining resource consumptions are checked during operation of the application.

Figure 7A:
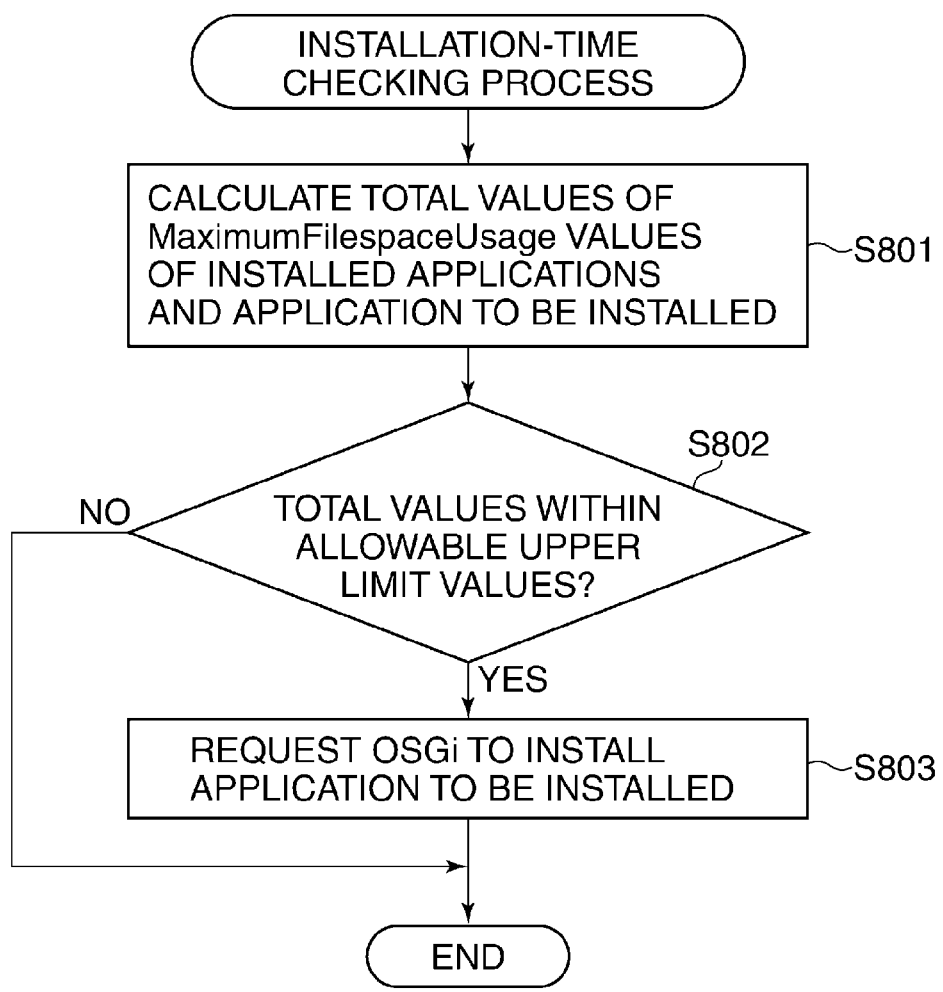
FIG. 7A is a flowchart of an installation-time checking process performed by a CPU appearing in FIG. 1.

FIG. 7A is a flowchart of an installation-time checking process performed by the CPU 101 appearing in FIG. 1.

Referring to FIG. 7A, when the installation controller 208 starts installation of an application, the installation controller 208 calculates a total value of respective "MaximumFilespaceUsage" values of installed applications and a "MaximumFilespaceUsage" value of the application to be installed (step S801).

Then, the installation controller 208 determines whether or not the total value calculated in the step S801 is within the allowable upper limit value (step S802). Here, it is determined whether or not the calculated amount of disk space to be used is within the allowable upper limit value allowed by the image forming apparatus 130.

If it is determined in the step S802 that the total value is within the allowable upper limit value (YES to the step S802), the installation controller 208 requests the OSGi 206 to install the application (step S803), followed by terminating the present process.

On the other hand, if the total value is not within the allowable upper limit value (NO to the step S802), the installation controller 208 terminates the present process without installing the application.

Figure 7B:
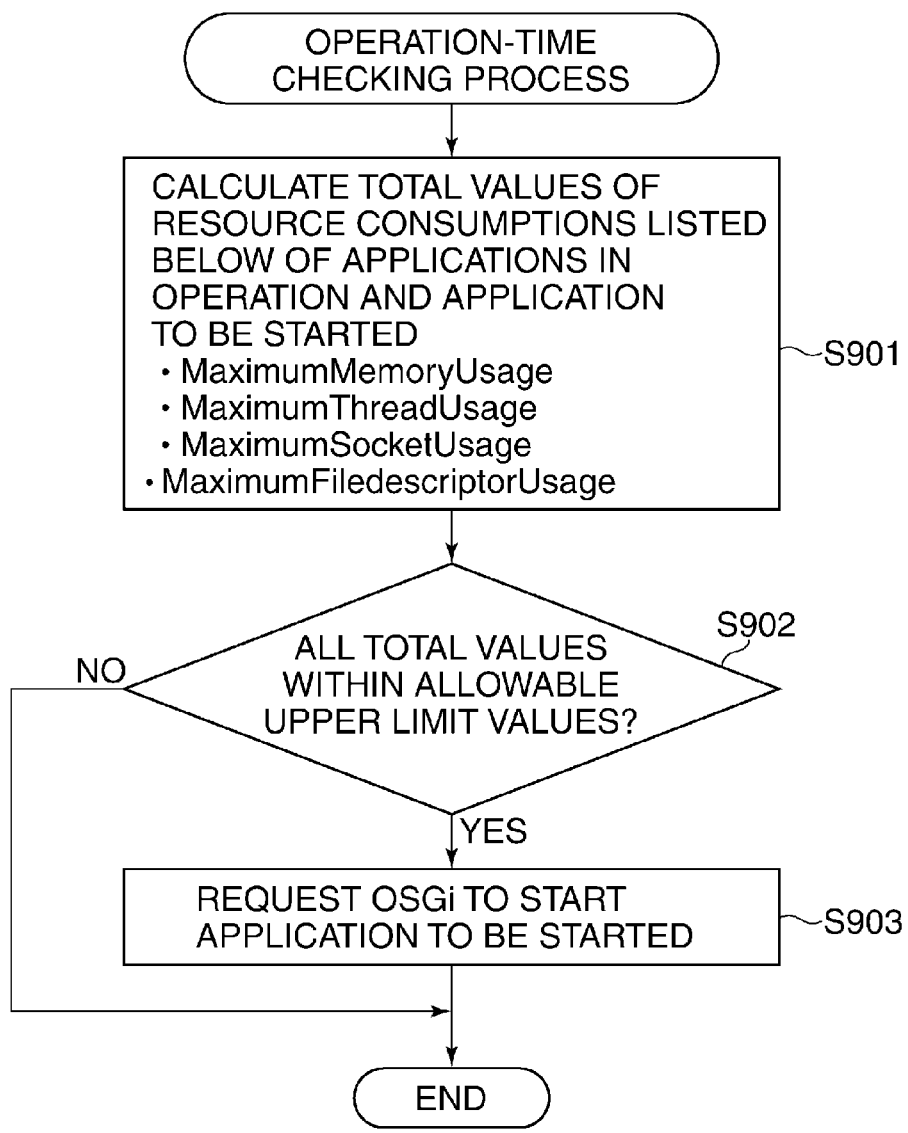
FIG. 7B is a flowchart of an operation-time checking process performed by the CPU appearing in FIG. 1.

FIG. 7B is a flowchart of an operation-time checking process performed by the CPU 101 appearing in FIG. 1.

Referring to FIG. 7B, the installation controller 208 calculates respective total values of "MaximumMemoryUsage" values, "MaximumThreadUsage" values, "MaximumSocketUsage" values, and "MaximumFiledescriptorUsage" values of applications in operation and an application to be started (step S901).

Next, the installation controller 208 determines whether or not respective total values of resource amounts calculated in the step S901 are within their allowable upper limit values (step S902).

If it is determined in the step S902 that the total values are within the respective allowable upper limit values (YES to the step S902), the installation controller 208 requests the OSGi 206 to start the application (step S903), followed by terminating the present process.

On the other hand, if it is determined in the step S902 that any of the total values are not within the respective allowable upper limit values (NO to the step S902), the installation controller 208 terminates the present process without starting the application.

As described above, in general, when an application is installed, a checking process concerning the resource consumptions is performed, and when the application is operated, another checking process concerning the resource consumptions is performed. A host bundle is installed through the processes described with reference to FIGS. 7A and 7B.

Next, a description will be given of a fragment bundle installation process and a fragment bundle uninstallation process.

Figure 8:
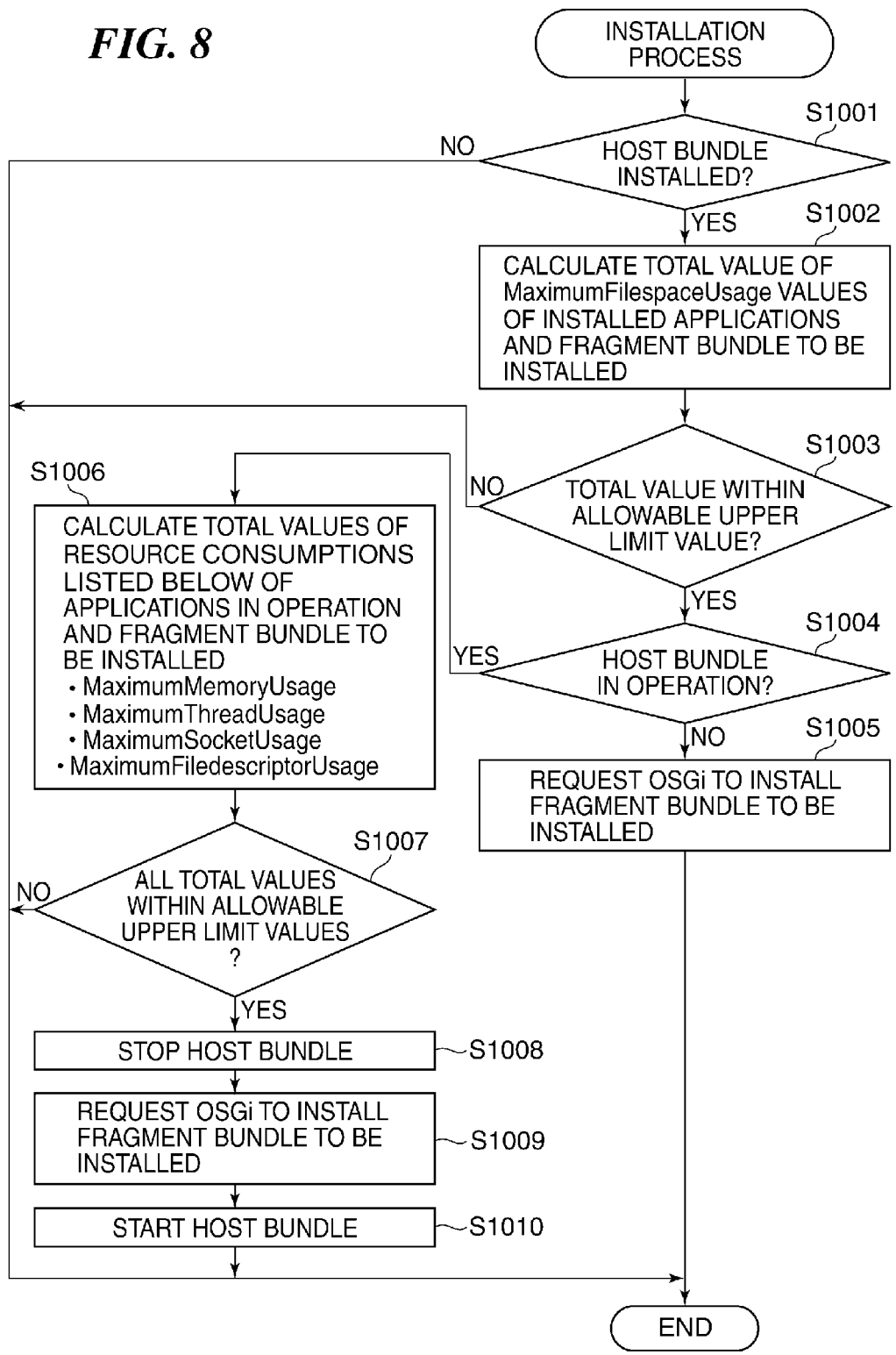
FIG. 8 is a flowchart of a fragment bundle installation process performed by the CPU.

FIG. 8 is a flowchart of the fragment bundle installation process performed by the CPU 101 appearing in FIG. 1.

Referring to FIG. 8, upon depression of the install button 525 appearing in FIG. 6B by the user, it is determined whether or not a host bundle associated with the fragment bundle to be installed has been installed (step S1001).

If it is determined in the step S1001 that the host bundle has not been installed (NO to the step S1001), the present process is terminated without installing the fragment bundle.

On the other hand, if it is determined in the step S1001 that the host bundle has been installed (YES to the step S1001), a total value of "MaximumFilespaceUsage" values of the installed applications and the fragment bundle to be installed is calculated (step S1002).

Then, it is determined whether or not the total value calculated in the step S1002 is within the allowable upper limit value of the amount of disk space to be used (step S1003).

If it is determined in the step S1003 that the total value is not within the allowable upper limit value (NO to the step S1003), the present process is terminated without installing the fragment bundle.

On the other hand, if it is determined in the step S1003 that the total value is within the allowable upper limit value (YES to the step S1003), it is determined whether or not the host bundle is in operation (step S1004).

If it is determined in the step S1004 that the host bundle is not in operation (NO to the step S1004), the OSGi 206 is requested to install the application (step S1005), followed by terminating the present process.

When the host bundle is not in operation, if only a resource consumption of disk space is checked, it is possible to allow installation of the application, and checking of the remaining resource consumptions is newly performed in the operation-time checking process described with reference to FIG. 7B.

On the other hand, if it is determined in the step S1004 that the host bundle is in operation (YES to the step S1004), the respective total values of the values of the resource consumptions "MaximumMemoryUsage", "MaximumThreadUsage", "MaximumSocketUsage", and "MaximumFiledescriptorUsage" of the applications in operation and the fragment bundle to be installed are calculated (step S1006). This step S1006 and the above-described step S1002 correspond to an operation of a calculation unit configured to calculate, in a case where the extension application is to be installed, respective total values of amounts of resources that are used by installed applications including the extension target application which is assumed to have been extended in function by the extension application.

Then, it is determined whether or not all the total values of the respective resource amounts calculated in the step S1006 are within their allowable upper limit values (step S1007). This step S1007 and the above-described step S1003 correspond to an operation of a determination unit configured to determine whether or not the calculated total values are within allowable upper limit values allowed by the information processing apparatus.

If it is determined in the step S1007 that not all the total values are within their allowable upper limit values (NO to the step S1007), the present process is terminated without installing the fragment bundle.

On the other hand, if it is determined in the step S1007 that all the total values are within their allowable upper limit values (YES to the step S1007), the host bundle is stopped (step S1008).

Then, the OSGi 206 is requested to install the application to be installed (step S1009). Subsequently, the host bundle having the fragment bundle installed therein is started (step S1010), followed by terminating the present process. This step S1009 and the above-described step S1005 correspond to an operation of an installation unit configured to install the extension application in a case where it is determined that all the total values are within their allowable upper limit values.

Figure 9:
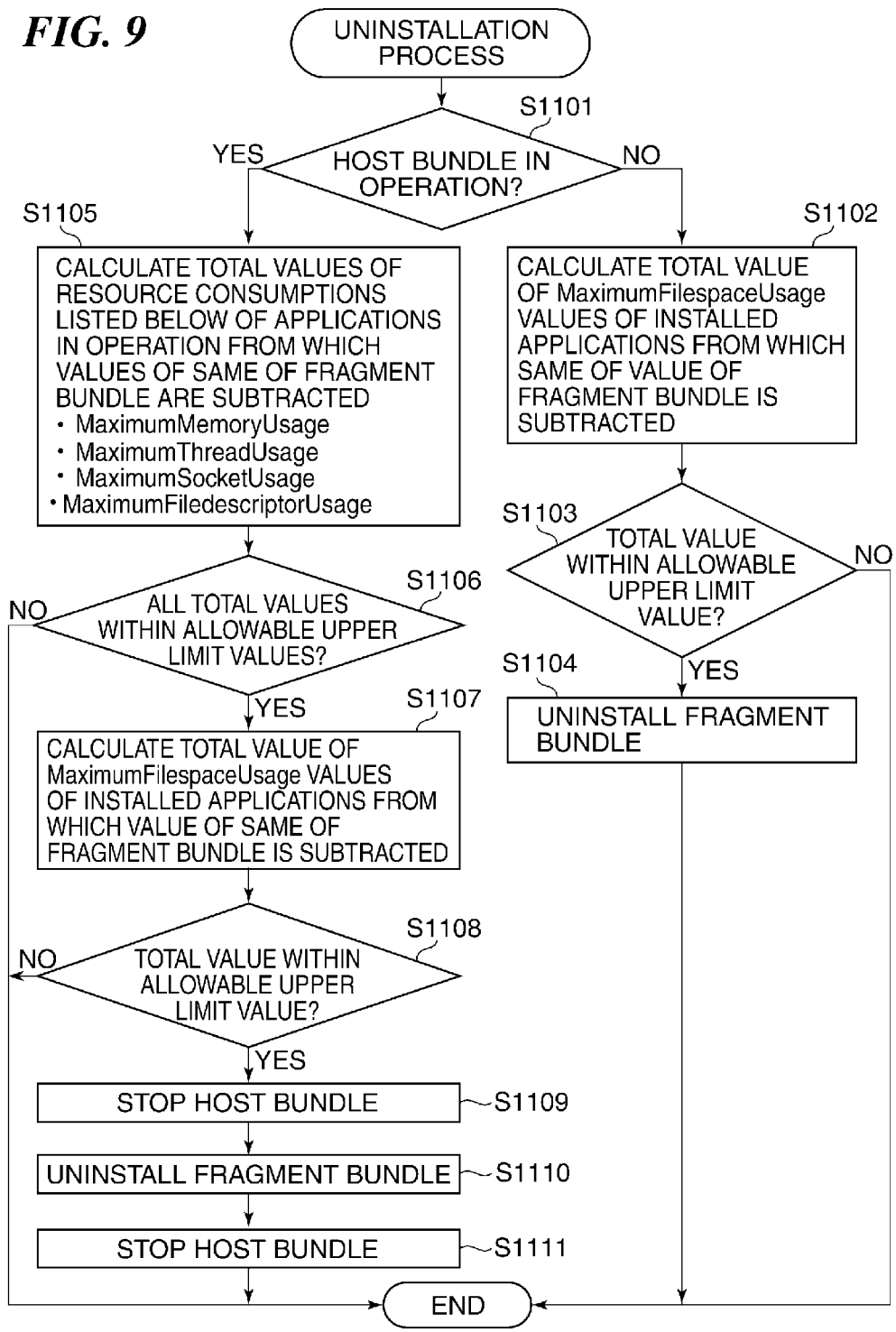
FIG. 9 is a flowchart of an uninstallation process performed by the CPU.

FIG. 9 is a flowchart of the uninstallation process performed by the CPU 101 appearing in FIG. 1.

Referring to FIG. 9, upon depression of the uninstall button 511 appearing in FIG. 6A by the user, it is determined whether or not the host bundle is in operation (step S1101).

If it is determined in the step S1101 that the host bundle is not in operation (NO to the step S1101), a total value of "MaximumFilespaceUsage" values of the installed applications from which a "MaximumFilespaceUsage" value of the fragment bundle to be uninstalled is subtracted is calculated (step S1102).

Then, it is determined whether or not the total value calculated in the step S1102 is within the allowable upper limit value of the amount of disk space to be used (step S1103). If it is determined in the step S1103 that the total value is not within the allowable upper limit value (NO to the step S1103), the present process is terminated without uninstalling the fragment bundle.

On the other hand, if it is determined in the step S1103 that the total value is within the allowable upper limit value (YES to the step S1103), the fragment bundle is uninstalled (step S1104), followed by terminating the present process.

Referring again to the step S1101, if it is determined in the step S1101 that the host bundle is in operation (YES to the step S1101), total values of the values of the resource consumptions "MaximumMemoryUsage", "MaximumThreadUsage", "MaximumSocketUsage", and "MaximumFiledescriptorUsage" of the applications in operation, from which values of the resource consumptions of the fragment bundle to be uninstalled are subtracted are calculated (step S1105).

This step S1105 and the above-described step S1102 correspond to an operation of another calculation unit configured to calculate, in a case where the extension application attached to the extension target application is to be uninstalled, respective total values of amounts of resources that are used by the installed applications including the extension target application to which the extension application is not attached.

Further, as shown in the step S1105 and the above-described step S1102, the total values of the respective resource consumptions are calculated by subtracting the amounts of the resources used by the fragment bundle, from the resources used by the installed applications including the host bundle having the fragment bundle installed therein.

Next, it is determined whether or not the total values of the respective resource consumptions calculated in the step S1105 are within their allowable upper limit values (step S1106). This step S1106 and the above-described step S1103 correspond to an operation of another determination unit configured to determine whether or not the calculated total values are within the allowable upper limit values allowed by the information processing apparatus.

If it is determined in the step S1106 that any of the total values are not within their allowable upper limit values (NO to the step S1106), the present process is terminated without uninstalling the fragment bundle.

On the other hand, if it is determined in the step S1106 that the total values are within their allowable upper limit values (YES to the step S1106), the total value of "MaximumFilespaceUsage" values of the installed applications from which the "MaximumFilespaceUsage" value of the fragment bundle to be uninstalled is subtracted is calculated (step S1107).

Then, it is determined whether or not the total value calculated in the step S1107 is within its allowable upper limit value (step S1108). If it is determined in the step 1108 that the total value is not within its allowable upper limit value (NO to the step S1108), the present process is terminated without uninstalling the fragment bundle.

On the other hand, if it is determined in the step S1108 that the total value is within its allowable upper limit value (YES to the step S1108), the host bundle is stopped (step S1109).

Then, the fragment bundle is uninstalled (step S1110), and the host bundle is started (step S1111), followed by terminating the present process. The step S1110 and the above-described step S1104 correspond to an operation of an uninstallation unit configured to uninstall the extension application when it is determined that the total values are within the allowable upper limit values.

FIG. 10 is a diagram of a deletion candidate screen 1200 displayed by the application management section 207 appearing in FIG. 2.

The deletion candidate screen 1200 presents to the user a fragment bundle which consumes large amounts of resources, as an uninstallation candidate, when it is impossible to install a fragment bundle because any of the resource consumptions of the fragment bundle exceeds their allowable upper limit values.

When the user is thus prompted to uninstall a fragment bundle consuming large amounts of resources and the fragment bundle is uninstalled, a possibility increases that the amounts of resources consumed by the fragment bundle to be installed can be secured.

Referring to FIG. 10, an application name 1201 is a field for displaying installed host bundles. Note that an application having no fragment bundle installed therein is not displayed on the deletion candidate screen 1200.

In the case of FIG. 10, it is shown that an application A 1206 and an application B 1207 have been installed. Further, it is also shown that a fragment bundle A 1208 has been attached to the application A 1206 which is a host bundle.

Further, it is also shown that a fragment bundle B 1209 and a fragment bundle C 1210 have been attached to the application B 1207 which is a host bundle.

Note that the fragment bundles are displayed in a decreasing order of the memory usage on the deletion candidate screen 1200.

An installation date 1202 indicates a date on which each fragment bundle was installed. An application ID 1203 indicates an ID (identifier) uniquely assigned to each fragment bundle.

A status 1204 indicates a status of a host bundle of each application. When the host bundle has been started, the status is displayed as "started", and when the host bundle has been stopped, the status is displayed as "stopped".

Resource consumption 1205 indicates amounts of resource consumptions by which the maximum resource consumptions are increased or reduced by uninstallation of a fragment bundle.

In the field of the resource consumption 1205, MEM indicates the amount of memory to be used, TH indicates the number of threads to be used, SOC indicates the number of sockets to be used, FD indicates the number of file descriptors to be used, and HDD indicates the amount of disk space to be used.

When the user checks a check box 1211 associated with a fragment bundle to be uninstalled, the fragment bundle becomes an object to be uninstalled.

Further, when the user depresses an uninstall button 1212, a fragment bundle associated with the checked check box 1211 is uninstalled. On the other hand, when the user depresses a cancel button 1213, display of the deletion candidate screen 1200 is terminated.

Figure 11:
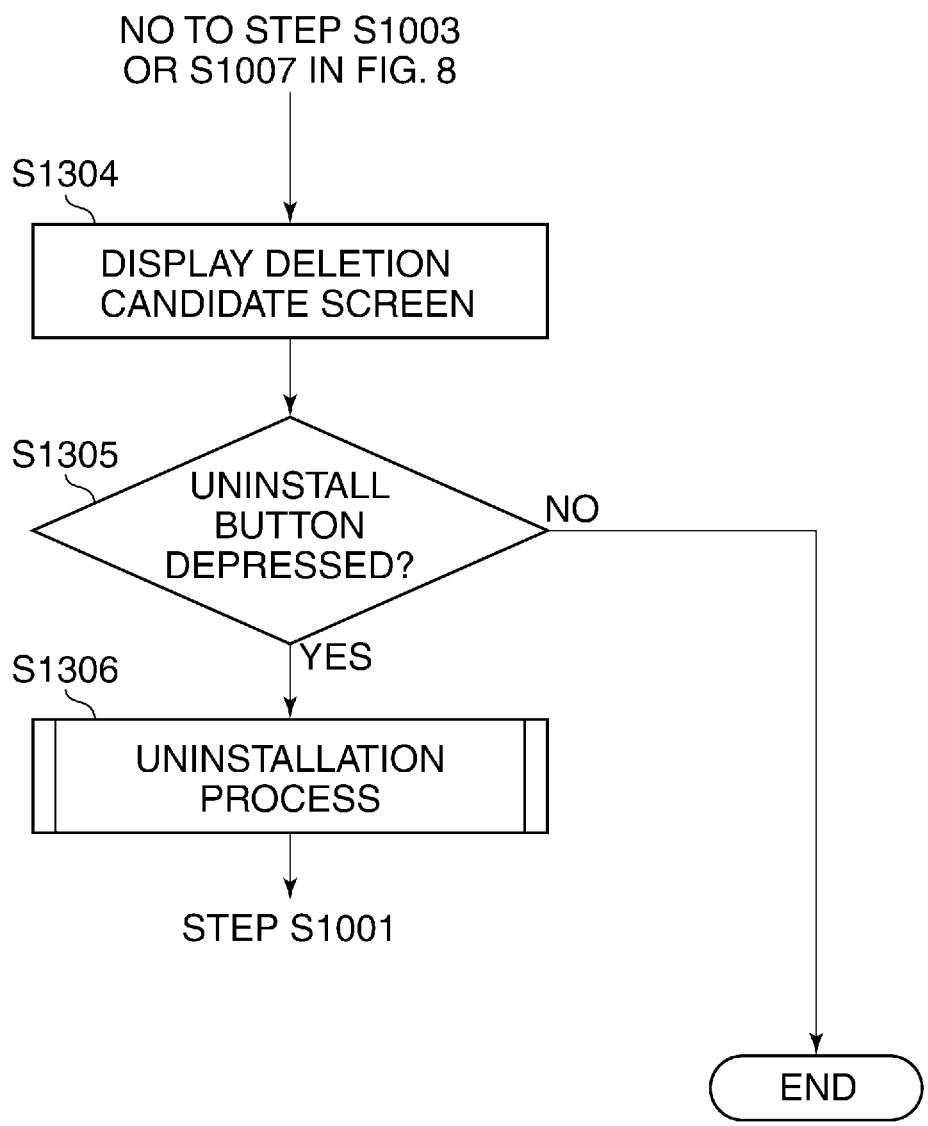
FIG. 11 is a flowchart of a fragment bundle installation process performed when the deletion candidate screen is displayed.

FIG. 11 is a flowchart of a fragment bundle installation process performed when the deletion candidate screen 1200 is displayed, which is a variation of the fragment bundle installation process described with reference to FIG. 8.

Referring to FIG. 11, when it is determined in the step S1003 or S1007 in the installation process in FIG. 8 that the total value(s) is/are not within the allowable upper limit value(s) (No to the step S1003 or S1007), the deletion candidate screen 1200 is displayed (S1304).

Next, on the deletion candidate screen 1200, it is determined whether or not the check box 1211 is checked, and the uninstall button 1212 is depressed, by the user (S1305).

If it is determined in the step S1305 that the cancel button 1213 is depressed by the user (NO to the S1305), the present process is terminated.

On the other hand, if it is determined in the step S1305 that the check box 1211 is checked, and the uninstall button 1212 is depressed, by the user (YES to the S1305), the uninstallation process in FIG. 9 is performed (step S1306), and the process returns to the step S1001 in the installation process in FIG. 8 again.

According to the process shown in FIG. 11, if it is impossible to install a fragment bundle because any of the resource consumptions of the fragment bundle exceed their allowable upper limit values, installation of the fragment bundle can be performed by displaying the deletion candidate screen for uninstalling a fragment bundle that has already been installed.

As described hereinabove, in the present embodiment, if it is determined that total values of respective resource consumptions are not within their allowable upper limit values, an installed fragment bundle is uninstalled which is checked and designated by the user on the deletion candidate screen 1200 displayed for uninstalling the installed fragment bundle.

Next, a description will be given of an installation process for simultaneously installing a host bundle and a fragment bundle.

As described above, the amounts of resources used when a fragment bundle is attached to a host bundle sometimes becomes smaller than when host bundle operates singly.

In this case, even when the host bundle cannot be installed singly because the resource consumptions thereof exceed allowable upper limit values thereof, it is possible to simultaneously install the host bundle and the fragment bundle.

Therefore, in the present embodiment, by enabling simultaneous installation of the host bundle and the fragment bundle, it is made possible to check resource consumptions during installation of the host and fragment bundles, using total values of consumptions of respective resources by the two bundles, as application resource consumptions.

Figure 12:
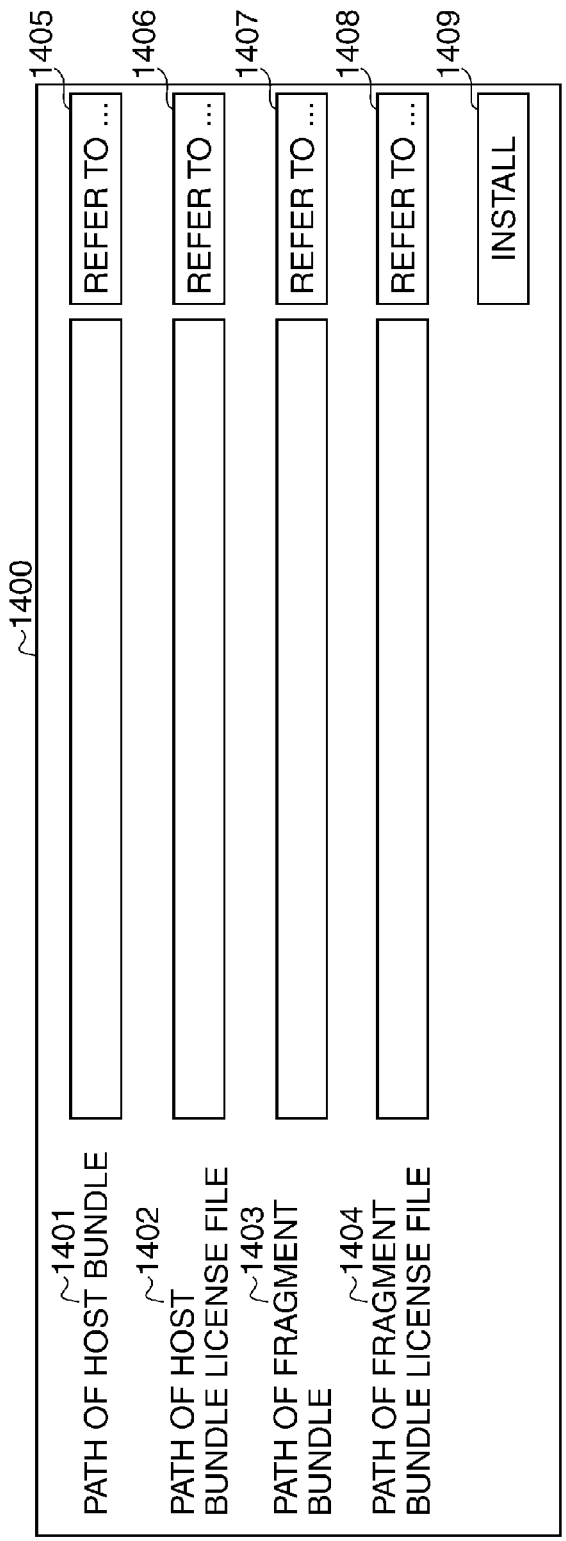
FIG. 12 is a diagram of a simultaneous installation screen displayed by an installation controller appearing in FIG. 2.

FIG. 12 is a diagram of a simultaneous installation screen 1400 displayed by the installation controller 208 appearing in FIG. 2.

Referring to FIG. 12, a reference button 1405 is a button for displaying a screen for selecting a file path of the host bundle. When a host bundle file is designated on the screen, a path to the host bundle is input to a path 1401 of the host bundle.

A reference button 1406 is a button for displaying a screen for selecting a file path. When a host bundle license file is designated on the screen, a path to the license file is input to a path 1402 of the license file of the host bundle.

A reference button 1407 is a button for displaying a screen for selecting a file path. When a fragment bundle file is designated on the screen, a path to the fragment bundle file is input to a path 1403 of the fragment bundle.

A reference button 1408 is a button for displaying a screen for selecting a file path. When a fragment bundle license file is designated on the screen, a path to the license file is input to a path 1404 of the fragment bundle license file.

An install button 1409 is a button for starting installation of an application designated by the path 521 of an application file.

At this time, resource consumptions by an application are represented by total values of resource consumptions declared in the manifest 403 of the host bundle and resource consumptions declared in the manifest 405 of the fragment bundle.

The host bundle and the fragment bundle are simultaneously installed by the installation-time checking process in FIG. 7A using the total values.

Note that although one fragment bundle is shown on the simultaneous installation screen 1400 in FIG. 12, a plurality of fragment bundles may be installed at the same time using a user interface via which a plurality of fragment bundles can be designated.

As described above, in the present embodiment, when a host bundle and a fragment bundle which are not installed in the image forming apparatus 130 are to be installed, they are installed regarding the amounts of resources used by the host bundle and the fragment bundle as the amounts of resources used by the host bundle in a case where the fragment bundle is attached to the host bundle.

As described heretofore, according to the present embodiment, first, respective total values of the amounts of resources which are used by installed applications including a host bundle assumed to have been extended in function by a fragment bundle, are calculated (steps S1003 and 1006).

Next, when the calculated total values are within allowable upper limit values allowed by the image forming apparatus 130 (YES to the step S1003 or S1007), the fragment bundle (extension application) is installed (steps S1005 and S1009).

Through the above-described process, it is possible to perform installation control by taking into account resource consumptions changed by installation of an application for extending a function.

Further, according to the above-described embodiment, first, when a fragment bundle attached to a host bundle is to be uninstalled, respective total values of the amounts of resources which are used by installed applications including the host bundle from which the fragment bundle is uninstalled are calculated.

Then, when the calculated total values are within allowable upper limit values allowed by the image forming apparatus 130 (YES to the step S1103 or YES to the step S1106), the fragment bundle is uninstalled (steps S1110 and S1104).

Through the above-described process, it is possible to perform installation control by taking into account resource consumptions changed by uninstallation of an application for extending a function.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2014-076176 filed Apr. 2, 2014 which is hereby incorporated by reference herein in its entirety.

What is claimed is:

1. An information processing apparatus that is capable of installing or uninstalling an extension application which operates using resources of the information processing apparatus and extends a function of an application installed in the information processing apparatus, comprising:

a first calculation unit configured to calculate, in a case where the extension application is to be installed, a first total value of amounts of resources that are used by the extension application and the installed applications, based on respective amounts of resources used by each of the extension application and the installed applications, wherein the installed applications include an extension target application whose function would be extended by installing the extension application, and wherein the respective amount of resources used by the extension target application corresponds to the amount of resources used by the extension target application prior to the installation of the extension application;

a second calculation unit configured to calculate, in a case where the extension application is to be uninstalled, a second total value of amounts of resources that are used by the installed applications, including the extension target application, after the extension application is uninstalled;

a determination unit configured to determine whether or not the calculated first or second total value of the amounts of resources is lower than an upper limit value for amounts of available resources predetermined by the information processing apparatus;

an installation unit configured to install, in the case where the extension application is to be installed, the extension application in a case where it is determined that the first total value of amounts of resources calculated by the first calculation unit is lower than the predetermined upper limit value; and an uninstallation unit configured to uninstall, in the case where the extension application is to be uninstalled, the extension application in a case where it is determined that the second total value of amounts of resources calculated by the second calculation unit is lower than predetermined upper limit value.

2. The information processing apparatus according to claim 1, wherein the first calculation unit calculates the first total value of the amount of resources used by the extension application using differences between amounts of the resources used by the extension target application when the extension application has not been installed and amounts of the resources used by the extension target application when the extension application has been installed.

3. The information processing apparatus according to claim 1, wherein in a case where it is determined by the determination unit that the first total value of amounts of resources that are used by the extension application and the installed applications is greater than the predetermined upper limit value, the extension application designated by a user on a screen for installing is not installed.

4. The information processing apparatus according to claim 1, wherein the second calculation unit calculates the second total value of amounts of resources that are used by the installed applications by subtracting amounts of the resources used by the extension application from amounts of the resources used by the installed applications including the extension target application to which the extension application is attached.

5. The information processing apparatus according to claim 1, wherein the resources include an amount of memory, a number of threads, a number of sockets, a number of file descriptors, or an amount of disk space.

6. A method of controlling an information processing apparatus that is capable of installing or uninstalling an extension application which operates using resources of the information processing apparatus and extends a function of an application installed in the information processing apparatus, the method comprising:

calculating, in a case where the extension application is to be installed, a first total value of amounts of resources that are used by the extension application and the installed applications, based on respective amounts of resources used by each of the extension application and the installed applications, wherein the installed applications include an extension target application whose function would be extended by installing the extension application, and wherein the respective amount of resources used by the extension target application corresponds to the amount of resources used by the extension target application prior to the installation of the extension application;

calculating, in a case where the extension application is to be uninstalled, a second total value of amounts of resources that are used by the installed applications, including the extension target application, after the extension application is uninstalled;

determining whether or not the calculated first or second total value of the amounts of resources is lower than an upper limit value for amounts of available resources predetermined by the information processing apparatus;

installing, in the case where the extension application is to be installed, the extension application in a case where it is determined that the first total value of amounts of resources calculated by the first calculation unit is lower than the predetermined upper limit value; and uninstalling, in the case where the extension application is to be uninstalled, the extension application in a case where it is determined that the second total value of amounts of resources calculated by the second calculation unit is lower than predetermined upper limit value.

7. A non-transitory computer-readable storage medium storing a computer-executable program for executing a method of controlling an information processing apparatus that is capable of installing or uninstalling an extension application which operates using resources of the information processing apparatus and extends a function of an application installed in the information processing apparatus, wherein the method comprises:

calculating, in a case where the extension application is to be installed, a first total value of amounts of resources that are used by the extension application and the installed applications, based on respective amounts of resources used by each of the extension application and the installed applications, wherein the installed applications include an extension target application whose function would be extended by installing the extension application, and wherein the respective amount of resources used by the extension target application corresponds to the amount of resources used by the extension target application prior to the installation of the extension application;

calculating, in a case where the extension application is to be uninstalled, a second total value of amounts of resources that are used by the installed applications, including the extension target application, after the extension application is uninstalled;

determining whether or not the calculated first or second total value of the amounts of resources is lower than an upper limit value for amounts of available resources predetermined by the information processing apparatus;

installing, in the case where the extension application is to be installed, the extension application in a case where it is determined that the first total value of amounts of resources calculated by the first calculation unit is lower than the predetermined upper limit value; and uninstalling, in the case where the extension application is to be uninstalled, the extension application in a case where it is determined that the second total value of amounts of resources calculated by the second calculation unit is lower than predetermined upper limit value.

* * * * *